March 19, 1968  B. L. KETELSEN  3,373,608
ELECTROMAGNETIC FLOWMETER

Filed March 8, 1966  2 Sheets-Sheet 1

INVENTOR.
BRODER L. KETELSEN
BY
ATTORNEY

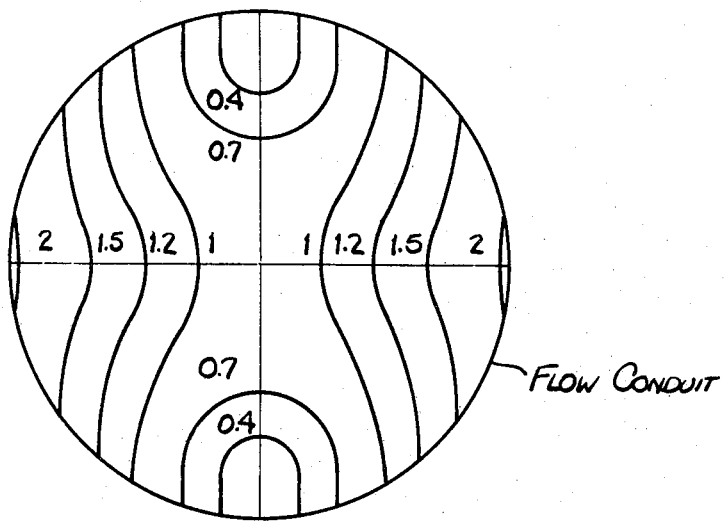
Fig. 3.
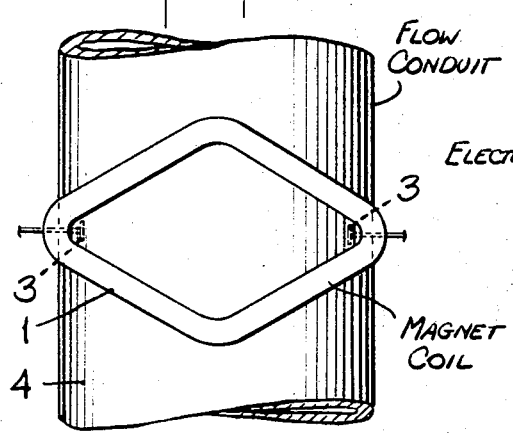
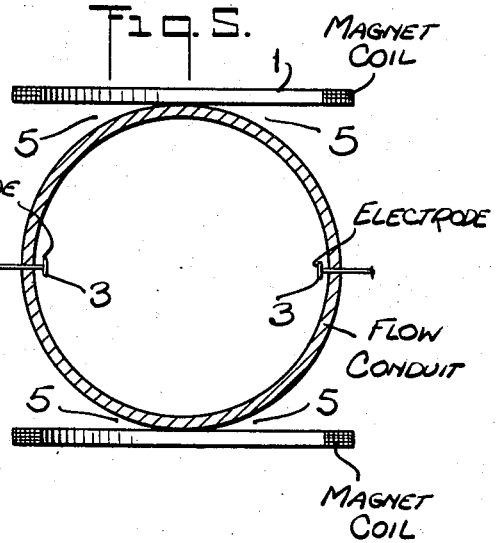

United States Patent Office 3,373,608
Patented Mar. 19, 1968

3,373,608
ELECTROMAGNETIC FLOWMETER
Broder Ludwig Ketelsen, Gross Ellerhausen, Germany, assignor to Fischer & Porter Co., Warminster, Pa., a corporation of Pennsylvania
Continuation-in-part of application Ser. No. 547,137, Oct. 15, 1964. This application Mar. 8, 1966, Ser. No. 532,664
14 Claims. (Cl. 73—194)

ABSTRACT OF THE DISCLOSURE

An electromagnetic flowmeter in which two electrodes are disposed at diametrically-opposed positions of a flow conduit through which passes the fluid to be measured, a magnetic coil being provided to establish a magnetic field in said conduit to produce a signal across the electrodes, which field has a non-uniform configuration so as to render the signal insensitive to changes in the velocity profile of the fluid.

Related application

This application is a continuation-in-part of application Ser. No. 547,137, filed Oct. 15, 1964, entitled "Inductive Flowmetering Instrument."

This invention relates generally to electromagnetic flowmeters, and more particularly to a flowmeter having a nonuniform magnetic field established therein to render said flowmeter insensitive to the fluid velocity profile.

Velocity profile is the representation of the fluid velocity distribution in a plane perpendicular to the flow direction. An axisymmetrical velocity profile is one in which the velocity is constant at any given radius measured in a direction perpendicular to the flow axis from the center of the flow tube. Velocity profile is a function of the viscosity of the fluid, the velocity of the fluid, the shape of the conduit containing the flow, and the presence of disturbances in the pipe line such as protrusions, elbows, reducers and other discontinuities.

Heretofore, in the design of electromagnetic flowmeters, particular emphasis has been put upon achieving a uniform magnetic field in a plane perpendicular to the flow direction and parallel to the electrode axis. It was believed that by establishing a uniform magnetic field therein, the output of the flowmeter would be unaffected by fluid velocity profile changes.

I have found that the generally accepted assumption that a uniform magnetic field is insensitive to fluid velocity profile is incorrect. This was demonstrated at a flow meter installation where the flowmeter was installed immediately downstream of a valve. Considerable errors were noted, even though a flowmeter with a uniform magnetic field was used. These results indicate that flowmeters cannot be installed immediately downstream of valves, elbows, or other profile-disturbing devices if the flow measurement is to be accurate within ±1% of the maximum flow value.

Accordingly, it is the main object of this invention to provide an electromagnetic flowmeter wherein a non-uniform magnetic field is established, the field having a configuration which renders the flowmeter insensitive to the fluid velocity profile.

More specifically, the object of the invention is to provide a flowmeter wherein a non-uniform magnetic field is established in the plane containing the electrode axis and perpendicular to the flow axis, whereby the field strength increases as distance from the electrode axis increases, and decreases as the distance from the center to the electrodes increases.

A significant advantage of the invention resides in the fact that it becomes possible to achieve much better results than have been attainable with uniform magnetic field flowmeters.

It is also an object of this invention to achieve the above-noted improvement in a simple and reliable manner.

Briefly stated, these objects are accomplished by producing a non-uniform magnetic field in a flowmeter such that at each point in the plane containing the electrode axis and perpendicular to the flow axis the product of the weighting factor times the magnetic flux density produces a constant value. The weighting factor is a measure of the affect of the signal generated at each point in the plane on the total signal measured at the electrodes.

If it were possible to design such a magnetic field which existed only in the plane of the electrodes, then a flowmeter which is error-free would result irrespective of cross-sectional shape or of fluid velocity profile disturbances. However, the design of a magnetic field which exits only in the plane of the electrodes is not possible. But there is also a weighting factor associated with every point in all the planes parallel to the plane which is perpendicular to the flow axis and containing the electrode axis. This invention results in a non-uniform magnetic field so arranged that the product of flux density times weighting factor at every point within these planes is constant within the plane. This constant value will decrease as the distance from the plane containing the electrodes increases. Both the flux density and the weighting factor decrease as this distance increases. It should be noted that the weighting factor is a function of the geometry of the conduit and the shape of the electrodes.

For a better understanding of the invention, as well as other objects and further features thereof, reference is made to the following detailed description thereof to be read in conjunction with the accompanying drawings, wherein:

FIG. 3 shows the magnetic flux distribution necessary to produce a constant product of weighting factor times flux density in the plane of the electrode axis;

FIG. 4 is a top view of an elliptical magnet coil in a flowmeter according to the invention; and FIG. 5 is a side view of the magnet coil.

This invention is based upon the fact that each fluid particle within the magnetic field contributes an amount to the total signal measured at the electrodes in accordance with the equation:

$$\Delta U_i = W_i(v_i \times B_i)$$

where:

$\Delta U_i$ = portion of signal voltage due to elemental fluid particle at some point $i$ within the magnetic field.
$B_i$ = magnetic flux density at the point being evaluated.
$W_i$ = weighting factor at the point being evaluated.
$v_i$ = fluid velocity at the point being evaluated.

Figure 1:
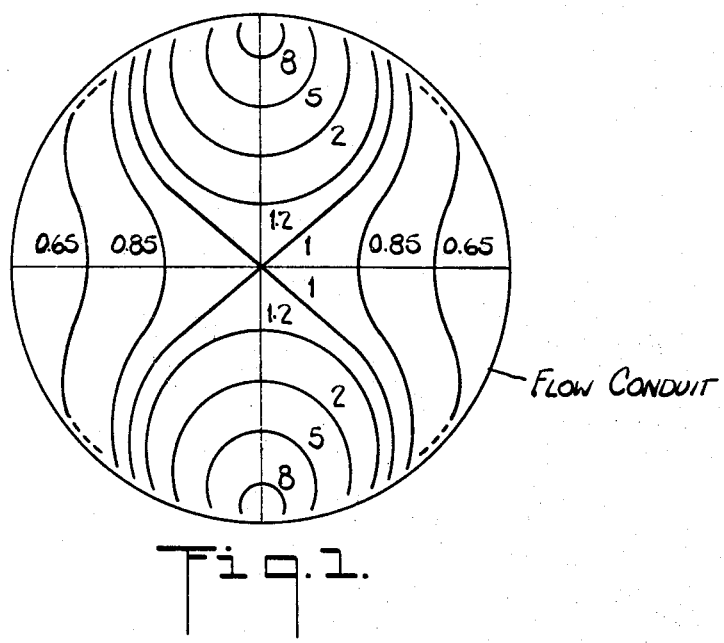
FIG. 1 is a graph representing the weighting factor distribution in the plane containing the electrodes for a flow conduit of circular cross-section.

FIGURE 1 represents the weighting factor distribution in the plane containing the electrodes for a circular cross-section conduit. The value of the weighting factor at the center has been chosen to be equal to unity. Its value increases in the direction of the ordinate toward the electrodes. The electrodes are located at the ends of the ordinate, the weighting factor increasing to a value of approximately 8. It will be observed that the value of the weighting factor decreases from the center outward along the abscissa.

Figure 2:
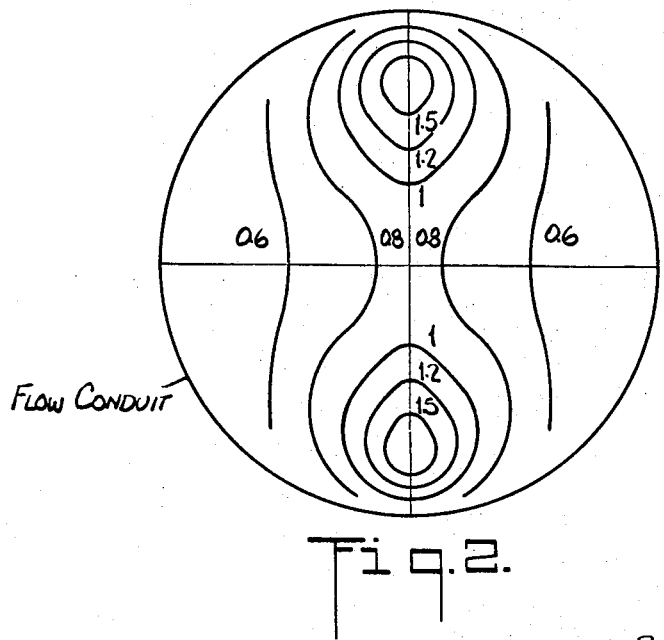
FIG. 2 is a graph representing the weighting factor distribution in a plane located ⅕ diameter from the electrode axis and perpendicular to the flow axis.

FIGURE 2 represents the weighting factor distribution in a plane located ⅕ diameter from the electrode axis and perpendicular to the flow axis. Although the values of the weighting factor are considerably different from those of FIG. 1, the trends are the same, namely that the value increases as the distance from the center increases along the ordinate, whereas the value decreases as the distance from the center increases along the abscissa.

Theoretically, the flux density distribution in the plane of the electrode should be inversely proportional to the weighting factor distribution in FIG. 1. The flux density distribution in the plane ⅕ diameter from the electrodes should be inversely proportional to the weighting factor distribution shown in FIG. 2. In FIG. 3, there is shown the magnetic field distribution which is necessary in order to produce a constant product of weighting factor times flux density in the plane of the electrode axis. Moreover, in accordance with the invention, the non-uniform magnetic field can be so designed that the sum of the products of weighting factor times flux density are constant from each line parallel to the flow axis.

A magnetic field of the desired non-uniformity can be approximated through the use of magnetic coils which are of an elliptical or diamond shape in which the ratio of average width to average length is approximately 0.5 to 0.7. A particularly advantageous coil configuration is one in which the average length of the coil is approximately equal to the diameter of the flow conduit, and the average width is approximately 0.6 times the average length. Each of these coils is positioned parallel to the electrode axis with its length axis perpendicular to the flow axis.

To further improve the non-uniformity of the magnetic field, a magnetic core made of iron laminations or soft iron particles imbedded in plastic can be used. This magnetic core can be positioned between the outside of the conduit and within the magnet coils or can also be positioned in the vicinity of the electrodes. For smaller sizes, flat, round magnetic coils can be used, positioned parallel to each other, whose ratio of average diameter to conduit diameter increases with increasing magnet coil cross-section and/or decreasing conduit diameters increases and varies between 0.8 and 1.5 for average conduit diameters.

FIGS. 4 and 5 are a top view and a side view of an approximately elliptical or diamond-shaped magnet coil in which magnet coils 1 and 2 are flat and parallel to each other, as well as being parallel to the electrode axis 3—3, average length of the coils being approximately equal to the diameter of conduit 4. The average maximum width is approximately 0.6 times the conduit diameter. This magnet-coil shape is suitable for conduits with circular cross-section.

A somewhat different magnet coil geometry would be required for conduits of other than circular cross-section in order to achieve the desired non-uniform magnetic field. It would be possible to bend the magnet coils or to add magnetic field-influencing iron cores (not shown) in the region 5 between the conduit 4 and the magnet coils 1, 2, or in the vicinity of the electrodes.

While there has been shown a preferred embodiment of the invention, various changes may be made therein without departing from the essential spirit thereof. Thus it is within the scope of this invention to provide special electrodes such as ring electrodes, partially insulated, in which an eddy current is produced whose magnetic field will tend to decrease the magnetic field in the region of the electrodes. It is also within the scope of this invention, to provide electrode locations to further enhance the non-uniformity of the field, in which design one electrode axis is located upstream from the magnetic field center and the other electrode axis is located downstream from the magnetic field center. It is intended, therefore, that the appended claims cover all such changes and modifications as fall within the true spirit of the invention.

What I claim is:

1. An electromagnetic flowmeter comprising:
   (a) a flow conduit for the passage of fluid to be measured, said conduit having a longitudinal flow axis,
   (b) two electrodes disposed at diametrically opposed positions on said conduit along an electrode axis perpendicular to the flow axis, and
   (c) magnetic coil means establishing a magnetic field in said conduit having a non-uniform configuration to produce a total signal across said electrodes which is a function of the velocity of fluid passing through the conduit and is substantially insensitive to changes in the velocity profile thereof, said field having a flux density distribution which substantially is inversely proportional to the weighting factor distribution in a transverse electrode plane which contains said electrode axis, said weighting factor being a measure of the influence of the flow signal generated at each point within said electrode plane on said total flow signal.

2. A flowmeter, as set forth in claim 1, wherein said conduit is constituted by a pipe section formed of insulating material.

3. A flowmeter, as set forth in claim 1, wherein said conduit is formed by a metal pipe section and said electrodes are mounted on an insulating liner thereon.

4. An electromagnetic flowmeter as set forth in claim 1, wherein the flux density of said non-uniform field in said electrode plane is at a minimum value at said electrodes and is at a maximum value at the positions along the wall of said conduit displaced 90° from said electrodes.

5. An electromagnetic flowmeter as set forth in claim 1, wherein the product of flux density times the weighting factor at every point in said electrode plane is substantially constant.

6. An electromagnetic flowmeter as set forth in claim 1, wherein said field configuration is such that the flux density increases as the distance from the electrode axis in a direction perpendicular to the flow axis increases, and the flux density decreases as the distance from the center in a direction parallel to the electrode axis increases, in such manner that the product of the weighting factor times the flux density approaches a constant value at every point within said transverse electrode plane and within the transverse planes parallel to said electrode plane in said magnetic field.

7. A flowmeter in accordance with claim 1, wherein said field is created by an elongated magnet coil located on either side of the conduit symmetrical to the electrode plane, the longer axis of the magnet coils being parallel to the electrode axis, with the shorter axis of the magnet coils being perpendicular to the electrode axis, the magnet coils being narrower towards the ends of the longer axis.

8. A flowmeter in accordance with claim 7, wherein each magnet coil is flat and has an approximately elliptical shape.

9. A flowmeter in accordance with claim 7, wherein the ratio of the average width to the average length of the magnet coils is 0.5 to 0.7.

10. A flowmeter in accordance with claim 9, wherein the average length of the magnet coil is approximately equal to the conduit diameter and the ratio of width to length is approximately 0.6.

11. A flowmeter in accordance with claim 7, in which two flat round magnet coils are positioned on each side of the conduit and are symmetrically disposed with respect to the electrode axis and parallel to each other, the ratio of the average magnet coil diameter to conduit diameter increasing with increasing magnet coil cross-section.

12. A flowmeter in accordance with claim 11, wherein the ratio is between 0.8 and 1.5.

13. An electromagnetic flowmeter comprising:
(a) a flow conduit for the passage of fluid to be measured, said conduit having a longitudinal flow axis,
(b) two electrodes disposed at diametrically opposed positions on said conduit along an electrode axis perpendicular to the flow axis, and
(c) magnetic coil means establishing a magnetic field in said conduit to produce a signal across said electrodes which is a function of the velocity of fluid passing through said conduit, said field having a nonuniform configuration whose distribution of flux density is such as to render said signal substantially insensitive to changes in the velocity profile of said fluid.

14. A flowmeter as set forth in claim 13, wherein the distribution of flux density is such as to cause the product of flux density times the weighting factor at every point in the transverse plane which contains said electrode axis to be substantially constant.

References Cited
UNITED STATES PATENTS

| | | | |
|---|---|---|---|
| 2,766,621 | 10/1956 | Raynsford et al. | 73—194 |
| 3,309,924 | 3/1967 | Kolin et al. | 73—194 |

RICHARD C. QUEISSER, *Primary Examiner.*

CHARLES A. RUEHL, *Examiner.*